(12) United States Patent
Nagasaka

(10) Patent No.: US 8,368,974 B2
(45) Date of Patent: Feb. 5, 2013

(54) IMAGE READING APPARATUS AND IMAGE FORMING APPARATUS CAPABLE OF SUPPRESSING DETERIORATION OF IMAGE QUALITY

(75) Inventor: Hideaki Nagasaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 431 days.

(21) Appl. No.: 12/720,641

(22) Filed: Mar. 9, 2010

(65) Prior Publication Data

US 2010/0302608 A1 Dec. 2, 2010

(30) Foreign Application Priority Data

May 28, 2009 (JP) ................................. 2009-129251

(51) Int. Cl.
*H04N 1/04* (2006.01)
(52) U.S. Cl. .......... 358/487; 358/475; 358/474; 358/1.1
(58) Field of Classification Search .................. 358/487, 358/475, 474, 1.1
See application file for complete search history.

(56) References Cited

U.S. PATENT DOCUMENTS

| | | | | |
|---|---|---|---|---|
| 4,408,231 | A * | 10/1983 | Bushaw et al. ............... | 358/406 |
| 5,844,695 | A | 12/1998 | Suzuki | |
| 6,456,748 | B1 | 9/2002 | Yushiya et al. | |
| 7,023,589 | B2 * | 4/2006 | Yamaguchi ................... | 358/487 |
| 7,453,055 | B2 | 11/2008 | Susaki | |
| 2006/0250661 | A1 | 11/2006 | Susaki | |

FOREIGN PATENT DOCUMENTS

| | | |
|---|---|---|
| JP | H09-163101 A | 6/1997 |
| JP | H10-327298 A | 12/1998 |
| JP | H11-088607 A | 3/1999 |
| JP | 2001-111781 A | 4/2001 |
| JP | 2011-111781 A | 4/2001 |
| JP | 2002-237929 A | 8/2002 |
| JP | 2005-184489 A | 7/2005 |
| JP | 2005-229238 A | 8/2005 |
| JP | 2006-311316 A | 11/2006 |
| JP | 2008-017276 A | 1/2008 |

OTHER PUBLICATIONS

Japan Patent Office, Office Action for Japanese Patent Application No. 2009-129251 (counterpart to above-captioned U.S. patent application), dated Mar. 22, 2012.

* cited by examiner

*Primary Examiner* — Houshang Safaipour
(74) *Attorney, Agent, or Firm* — Baker Botts L.L.P.

(57) ABSTRACT

A light source lights up at luminance associated with supplied electric current. An electric-current supplying section supplies the light source with electric current. A control section controls the electric-current supplying section. A reading section reads at least one sheet of an original document on which light from the light source is irradiated and generates image data. A determining section determines whether a change in the electric current flowing through the light source is large, based on a predetermined criterion, during a period when the reading section reads the at least one sheet of the original document. When the reading section reads the at least one sheet of the original document, the control section increases electric current supplied to the light source if the determining section determines that the change is large relative to electric current supplied to the light source when the determining section determines that the change is small.

19 Claims, 10 Drawing Sheets

FIG. 7

| MINIMUM VALUE | MEDIAN | MAXIMUM VALUE | AMOUNT OF CHANGE (MAXIMUM VALUE − MINIMUM VALUE) | RATIO OF CHANGE (MAXIMUM VALUE − MINIMUM VALUE)/MEDIAN |
|---|---|---|---|---|
| 99.5 | 100.0 | 100.5 | 1.0 | ±0.5% |
| 86.0 | 87.5 | 89.0 | 3.0 | ±1.7% |
| 73.5 | 75.0 | 76.5 | 3.0 | ±2.0% |
| 60.5 | 62.5 | 64.5 | 4.0 | ±3.2% |
| 48.0 | 50.0 | 52.0 | 4.0 | ±4.0% |
| 35.5 | 37.5 | 39.5 | 4.0 | ±5.3% |
| 23.0 | 25.0 | 27.0 | 4.0 | ±8.0% |
| 10.5 | 12.5 | 14.5 | 4.0 | ±16.0% |

LIGHT-SOURCE ELECTRIC CURRENT VALUE: HIGH ←→ LOW

IMAGE READING APPARATUS AND IMAGE FORMING APPARATUS CAPABLE OF SUPPRESSING DETERIORATION OF IMAGE QUALITY

CROSS REFERENCE TO RELATED APPLICATIONS

This application claims priority from Japanese Patent Application No. 2009-129251 filed May 28, 2009. The entire content of the priority application is incorporated herein by reference.

TECHNICAL FIELD

The invention relates to an image reading apparatus and an image forming apparatus.

BACKGROUND

Conventionally, an image reading apparatus is known that changes the magnitude of an electric current supplied to a light source, depending on whether an original document is read at a high resolution or at a low resolution. In this image reading apparatus, LED electric current is set to 20 [mA] when reading at 360 dpi, while LED electric current is set to 10 [mA] when reading at 180 dpi.

SUMMARY

Generally, the magnitude of electric current flowing through a light source fluctuates due to changes in temperature of components of an electrical circuit for supplying the light source with electric current and temperature of the light source itself. Hence, even if electric current to be supplied to the light source is set to 20 [mA], for example, temperature may change in the middle of reading an original document, causing electric current flowing through the light source to change.

If the magnitude of electric current fluctuates, luminance of the light source changes in the middle of reading sheets of an original document. This causes a problem that colors vary on images although the same color is read, thereby deteriorating image quality.

In view of the foregoing, it is an object of the invention to provide an image reading apparatus and an image forming apparatus that can suppress deterioration of image quality when changes of electric current flowing through a light source is large, and that can obtain high-quality images when the changes are small.

In order to attain the above and other objects, the invention provides an image reading apparatus. The image reading apparatus includes a light source, an electric-current supplying section, a control section, a reading section, and a determining section. The light source is configured to light up at luminance associated with supplied electric current. The electric-current supplying section is configured to supply the light source with electric current. The control section is configured to control the electric-current supplying section. The reading section is configured to read at least one sheet of an original document on which light from the light source is irradiated and to generate image data. The determining section is configured to determine whether a change in the electric current flowing through the light source is large, based on a predetermined criterion, during a period when the reading section reads the at least one sheet of the original document. When the reading section reads the at least one sheet of the original document, the control section is configured to increase electric current supplied to the light source if the determining section determines that the change is large relative to electric current supplied to the light source when the determining section determines that the change is small.

According to another aspect, the invention provides an image forming apparatus. The image forming apparatus includes an image reading unit and an image forming unit. The image reading unit includes a light source, an electric-current supplying section, a control section, a reading section, and a determining section. The light source is configured to light up at luminance associated with supplied electric current. The electric-current supplying section is configured to supply the light source with electric current. The control section is configured to control the electric-current supplying section. The reading section is configured to read at least one sheet of an original document on which light from the light source is irradiated and to generate image data. The determining section is configured to determine whether a change in the electric current flowing through the light source is large, based on a predetermined criterion, during a period when the reading section reads the at least one sheet of the original document. When the reading section reads the at least one sheet of the original document, the control section is configured to increase electric current supplied to the light source if the determining section determines that the change is large relative to electric current supplied to the light source when the determining section determines that the change is small. The image forming unit is configured to form an image on a recording medium based on the image data generated by the image reading unit.

According to still another aspect, the invention provides an image reading apparatus. The image reading apparatus includes: a light source that is configured to light up at luminance associated with supplied electric current; electric-current supplying means for supplying the light source with electric current; control means for controlling the electric-current supplying means; reading means for reading at least one sheet of an original document on which light from the light source is irradiated and for generating image data; and determining means for determining whether a change in the electric current flowing through the light source is large, based on a predetermined criterion, during a period when the reading means reads the at least one sheet of the original document. When the reading means reads the at least one sheet of the original document, the control means increases electric current supplied to the light source if the determining means determines that the change is large relative to electric current supplied to the light source when the determining means determines that the change is small.

BRIEF DESCRIPTION OF THE DRAWINGS

Embodiments in accordance with the invention will be described in detail with reference to the following figures wherein:

FIG. 7 is a table showing the relationships between light-source electric current values and magnitudes of changes thereof;

DETAILED DESCRIPTION

First Embodiment

An image reading apparatus and an image forming apparatus according to a first embodiment of the invention will be described while referring to FIGS. 1 through 8.

(1) Structure of Image Reading Apparatus

Figure 1:
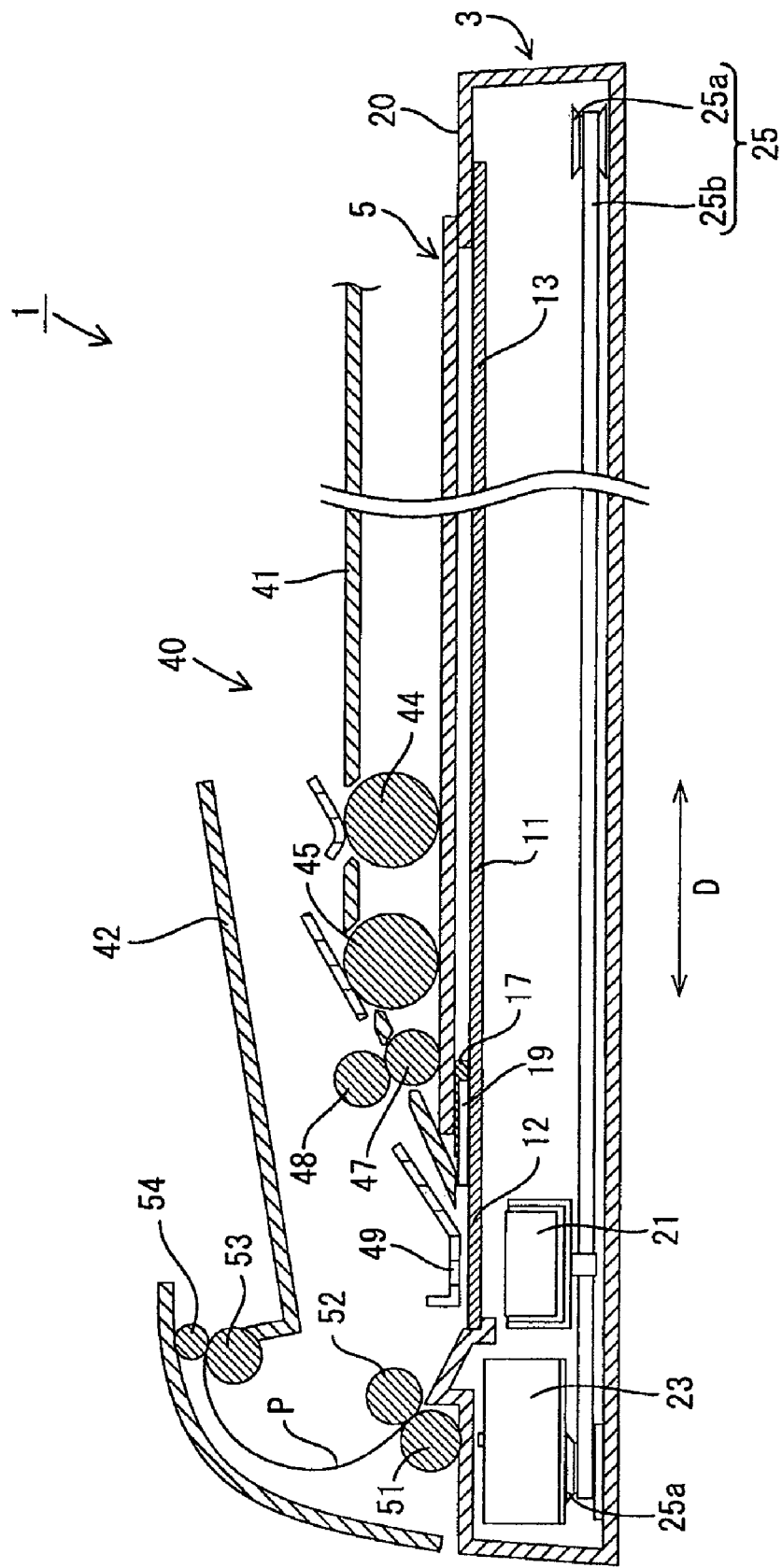
FIG. 1 is a vertical cross-sectional view showing the relevant parts of an image reading apparatus according to a first embodiment of the invention.

The image reading apparatus of the embodiment is applied to an image scanner 1. As shown in FIG. 1, the image scanner 1 is a so-called flatbed (FB) type scanner device. The image scanner 1 includes a device main body 3 having a platen glass 13 on which an original document is placed, and an FB cover 5 provided at the upper side of the device main body 3 so as to be capable of opening and closing.

The device main body 3 includes the platen glass 13, a casing 20, a positioning member 17, a white reference plate 19, a reading device 21, an FB motor 23, and a belt mechanism 25. The platen glass 13 has a first reading surface 11 and a second reading surface 12. The casing 20 supports the platen glass 13. The positioning member 17 is for positioning an original document placed on the first reading surface 11. The white reference plate 19 has a predetermined reflectance. The FB motor 23 and the belt mechanism 25 move the reading device 21 in cooperation with each other.

The top surface of the platen glass 13 is divided into the first reading surface 11 and the second reading surface 12 by the positioning member 17 that is detachably provided at the casing 20. The first reading surface 11 is a region for reading an original document placed on the surface by a user. The first reading surface 11 is covered by the FB cover 5 in a state where the FB cover 5 is closed. The second reading surface 12 is a region for reading an original document P that is conveyed by an ADF 40 (Auto Document Feeder) provided at the FB cover 5.

The reading device 21 is disposed at the under side of the platen glass 13, so as to be movable in a sub-scanning direction (a direction D in FIG. 1) parallel to the board surface of the platen glass 13. The reading device 21 is fixed to a belt 25b looped around a pair of rollers 25a of the belt mechanism 25, so that the reading device 21 moves in the sub-scanning direction with circular movement of the belt 25b moved by driving force generated by the FB motor 23.

The white reference plate 19 is disposed between the positioning member 17 and the platen glass 13, in an orientation extending in a main scanning direction which is perpendicular to the surface of the drawing. The white reference plate 19 is a white-color member having a high reflectance, and is used for adjusting light intensity of a light source (see FIG. 2) and for generating white level data for shading correction.

When reading an original document P conveyed to the top side of the second reading surface 12 by operation of the ADF 40 provided at the FB cover 5, the reading device 21 is moved to the under side of the second reading surface 12 and stops. When reading an original document on the first reading surface 11, the reading device 21 is moved in the sub-scanning direction at the under side of the first reading surface 11, by operations of the FB motor 23 and the belt mechanism 25.

As described above, the FB cover 5 includes the ADF 40, and conveys an original document P placed on a paper feeding tray 41 onto the second reading surface 12, and discharges the original document P read by the reading device 21 on the second reading surface 12 to a paper discharging tray 42, as described below.

The ADF 40 includes paper feeding rollers 44 and 45 at the beginning point of a conveying path. The original document placed on the paper feeding tray 41 is conveyed downstream along the conveying path by the paper feeding rollers 44 and 45. The original document P conveyed by the paper feeding rollers 44 and 45 is conveyed farther downstream along the conveying path by conveying rollers 47 and 48.

At the downstream side of the conveying rollers 47 and 48 on the conveying path, an upper plate 49 is provided so as to oppose the second reading surface 12 with a predetermined space therebetween. The original document P conveyed by the conveying rollers 47 and 48 passes between the upper plate 49 and the second reading surface 12, is conveyed by a pair of conveying rollers 51 and 52 provided farther downstream on the conveying path, and is subsequently discharged onto the paper discharging tray 42 by a pair of paper discharging rollers 53 and 54.

(2) Electrical Configuration of Image Scanner

Figure 2:
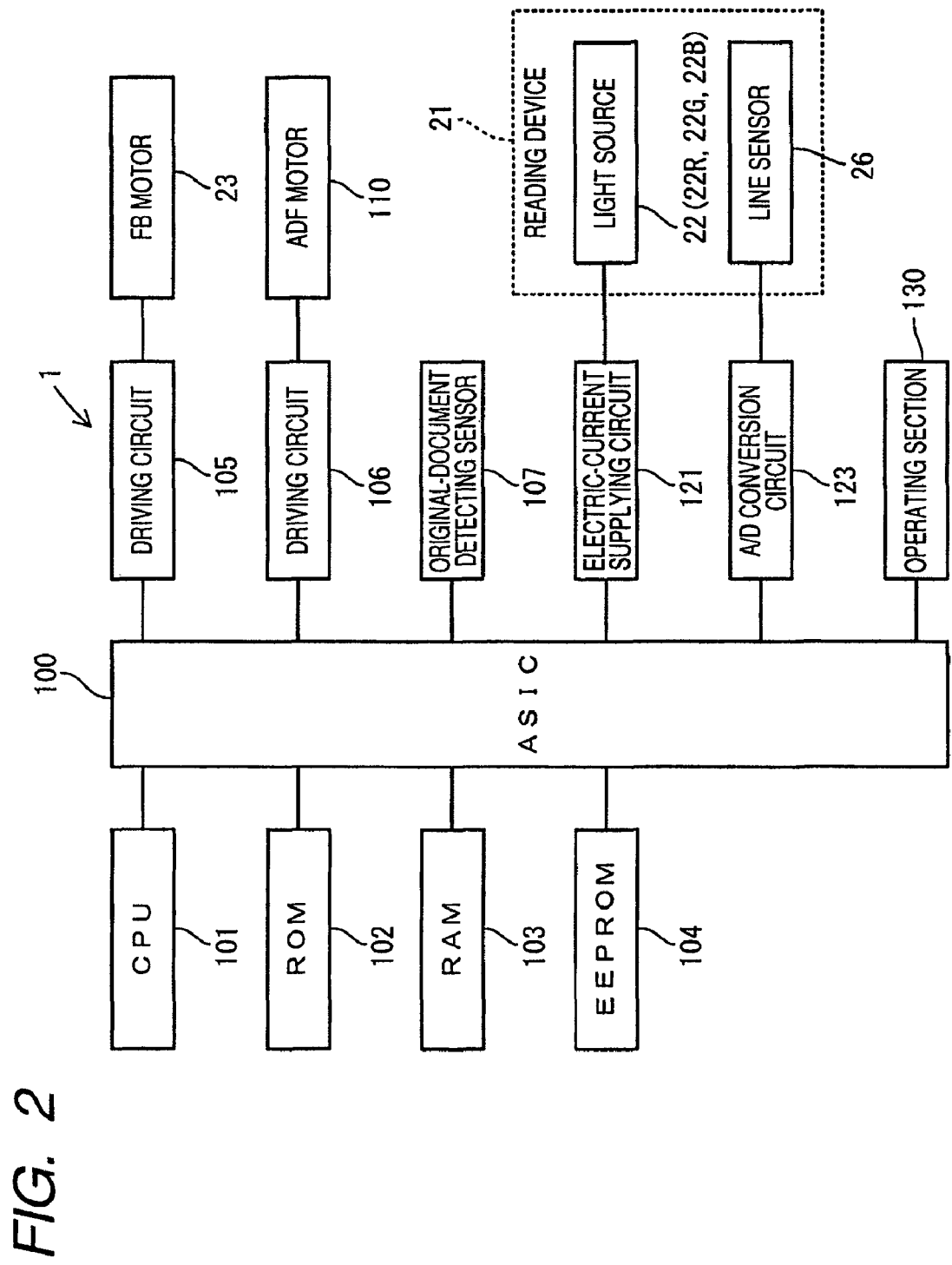
FIG. 2 is a block diagram showing the electrical configuration of the image reading apparatus.

As shown in FIG. 2, the image scanner 1 includes an ASIC 100, a CPU 101, a ROM 102, a RAM 103, an EEPROM 104, the FB motor 23, an FB motor driving circuit 105, an ADF motor 110, an ADF motor driving circuit 106, an original-document detecting sensor 107, the reading device 21, an electric-current supplying circuit 121, an A/D conversion circuit 123, an operating section 130, and the like.

As shown in FIG. 2, the ASIC 100 is connected to the FB motor driving circuit 105, the ADF motor driving circuit 106, the original-document detecting sensor 107, the electric-current supplying circuit 121, the A/D conversion circuit 123, the operating section 130, and the like. The ASIC 100 controls these components under controls of the CPU 101, and performs gamma correction, shading correction, and other various types of image processing for pixel values outputted from the A/D conversion circuit 123, thereby generating image data having three (R, G, and B) pixel values for each pixel. Note that shading correction may be performed by the CPU 101, not by the ASIC 100.

The original-document detecting sensor 107 is provided at the paper feeding tray 41 for detecting an original document on the paper feeding tray 41. The original-document detecting sensor 107 is, for example, a switch configured to be pressed by an original document P to turns to an "on" state when the original document P is placed on the paper feeding tray 41, and to return to an "off" state by the urging force of a spring (not shown) when the original document P is not placed.

The reading device 21 includes a line sensor 26 and a light source 22. The line sensor 26 includes a plurality of light receiving elements arranged linearly (in a line) in the main scanning direction. The light source 22 includes a light source 22R including a plurality of LEDs (Light Emitting Diodes) arranged linearly in the extending direction of the line sensor 26 and configured to emit light in red (R) color, a light source 22G including a plurality of LEDs arranged linearly and configured to emit light in green (G) color, and a light source 22B including a plurality of LEDs arranged linearly and configured to emit light in blue (B) color. Each of the light sources 22R, 22G, and 22B lights up with luminance (in other words, luminosity of the light source 22 or light intensity of the light source 22) associated with the magnitude of electric current supplied from the electric-current supplying circuit 121. The reading device 21 uses the line sensor 26 to receive reflected light which is reflected by the original document irradiated by light from the light source 22, and outputs voltages associated with electric charges accumulated by each light receiving element of the line sensor 26.

The electric-current supplying circuit 121 is connected to the light source 22. The electric-current supplying circuit 121 supplies the light source 22 with electric current based on a PWM signal outputted from the ASIC 100.

The CPU 101 controls the ASIC 100 to adjust a duty ratio (LEDPWM adjustment value) of a pulse width and a pulse period of a PWM signal for each color of the light source 22, thereby adjusting the magnitude of electric current supplied to each of the light sources 22R, 22G, and 22B.

Additionally, the CPU 101 controls the ASIC 100 to adjust a duty ratio (LEDDUTY adjustment value) of an output period and a non-output period of a PWM signal in a period of one line for each color of the light source 22, thereby adjusting the lighting time (lighting period) of each of the light sources 22R, 22G, and 22B.

Note that adjustments of the magnitude of electric current supplied to the light source 22 and the lighting time may be performed by the ASIC 100, not the CPU 101.

The A/D conversion circuit 123 is an electrical circuit for performing gain adjustments of an voltage outputted from the reading device 21 and converting a gain-adjusted voltage to a digital output value (pixel value).

The operating section 130 is provided at the front side of the device main body 3, and includes various operating switches. A user can perform setting of reading conditions, make instructions for reading, and the like, by operating the operating section 130.

Figure 3:
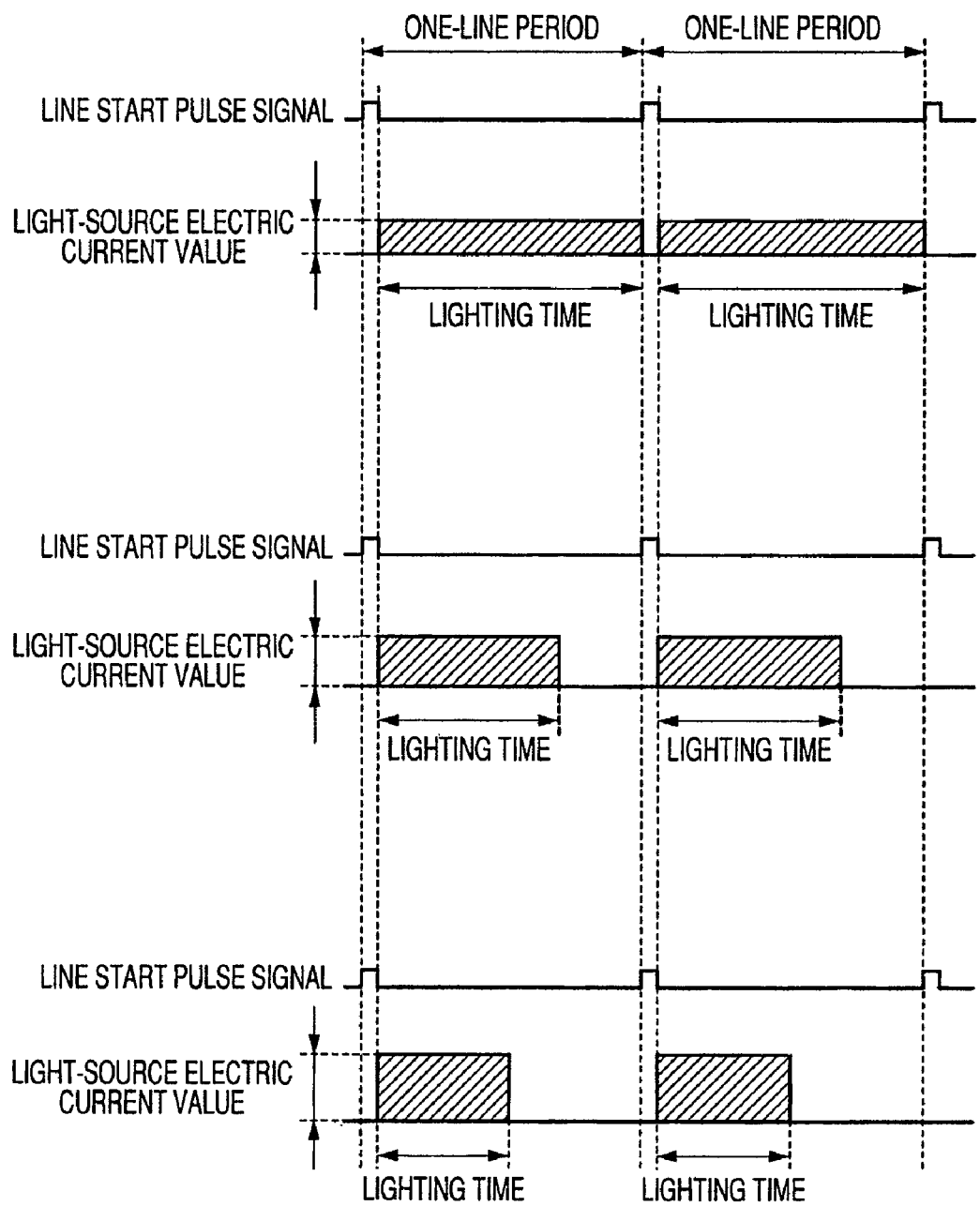
FIG. 3 is a timing chart for illustrating the relationships between electric current and lighting time.

(3) Relationship Between Magnitude of Electric Current Supplied to Light Source and Lighting Time of Light Source FIG. 3 shows the relationships between the magnitude of electric current supplied to the light source 22 and the lighting time of the light source 22. In the present embodiment, the setting value of the magnitude of electric current supplied to the light source 22 (a light-source electric current value) is changed according to the reading conditions and the magnitude of changes in electric current flowing through the light source 22 to be described below. At this time, the CPU 101 also changes the lighting time in order to maintain a product of the light-source electric current value and the lighting time of the light source 22 for one line (corresponding to the area of each hatched-line region in FIG. 3) at a constant value.

For example, when reducing the light-source electric current value, the lighting time is increased according to the amount of reduction of the light-source electric current value, thereby maintaining the product of the light-source electric current value and the lighting time at a constant value. Conversely, when increasing the light-source electric current value, the lighting time is decreased according to the amount of increase of the light-source electric current value, thereby maintaining the product at the constant value.

By maintaining the product of the light-source electric current value and the lighting time at a constant value, the light intensity received by each light receiving element does not differ considerably when the same original document is read before and after the light-source electric current value is changed, so that lightness of an image represented by image data does not differ considerably no matter which light-source electric current value is set.

Figure 4:
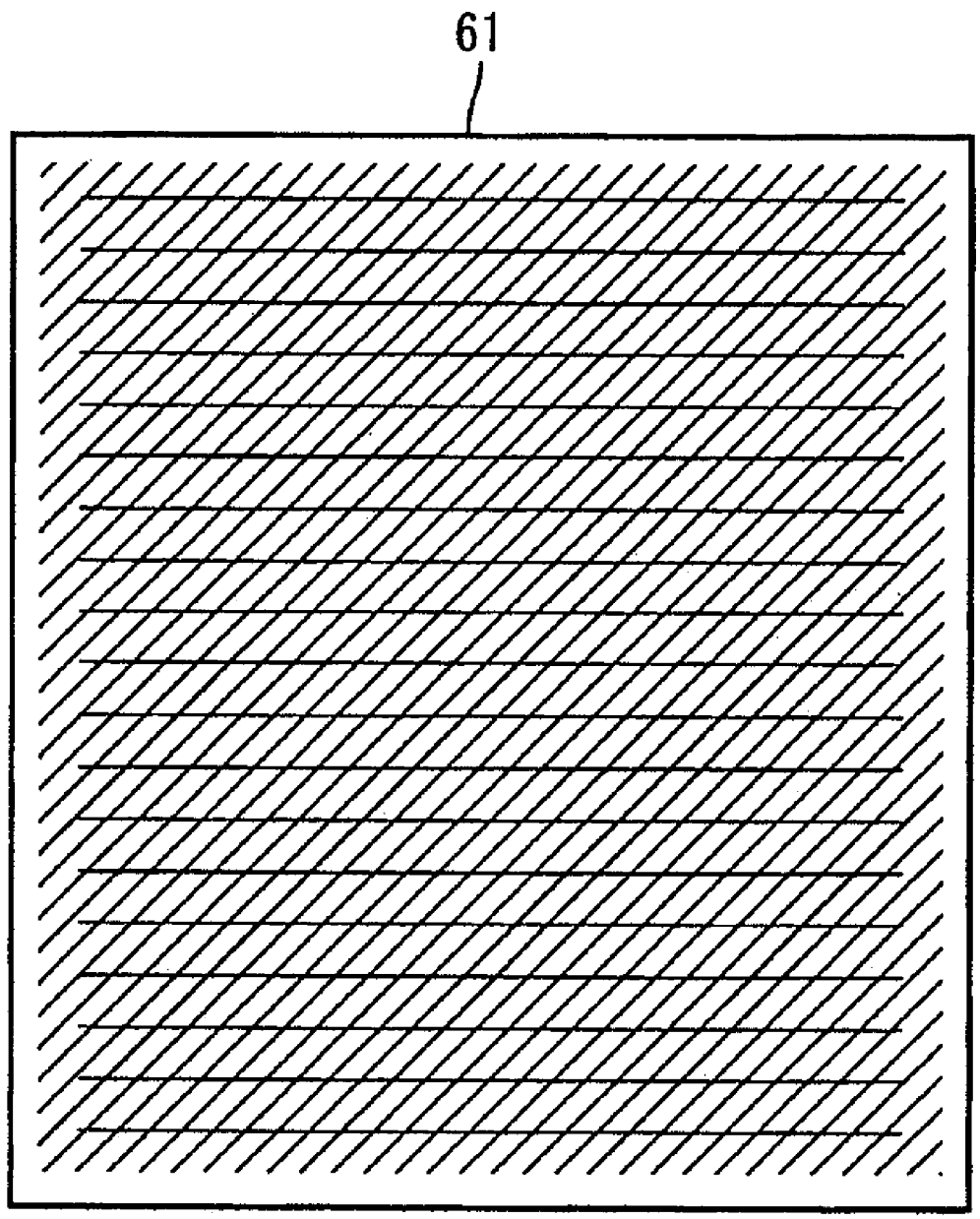
FIG. 4 is an explanatory diagram showing an example of an image generated by reading an original document.
Figure 5:
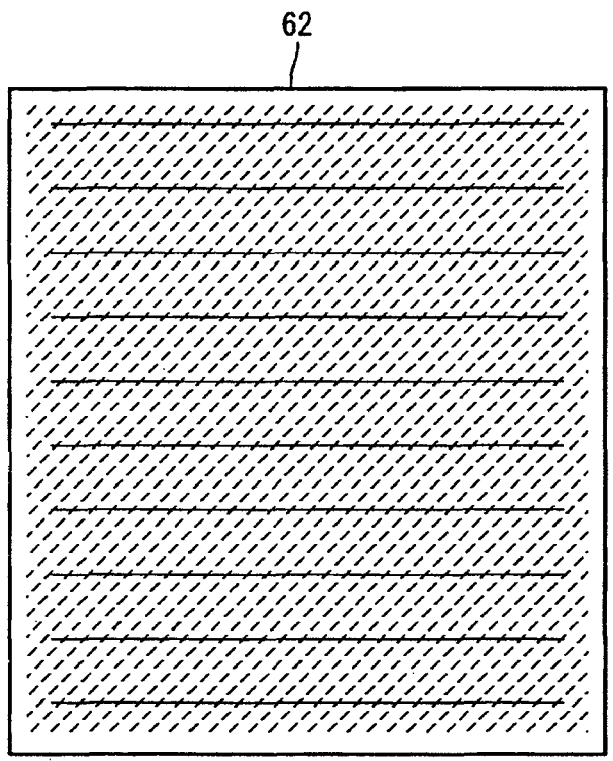
FIG. 5 is an explanatory diagram showing an example of another image generated by reading the original document.

FIGS. 4 and 5 show images that are obtained by reading the same original document by changing the lighting time of the light source 22. FIG. 4 shows an image 61 that is obtained by reading the original document with a longer lighting time, and reproduces the original document fairly accurately. In contrast, FIG. 5 shows an image 62 that is obtained by reading the original document with a shorter lighting time. As the lighting time is shortened, a distance by which the line sensor 26 moves relative to the original document during each turn-off period of the light source 22 becomes longer, causing skipped regions to increase. Hence, in the image 62 shown in FIG. 5, ruled lines are skipped alternately. That is, the image 62 is a low-quality image having many skipped regions.

That is, an original document can be read with high quality by reducing the light-source electric current value and by increasing the lighting time by a length corresponding to (compensating) the reduction of the light-source electric current value.

(4) Change in Electric Current Flowing Through Light Source

Figure 6:
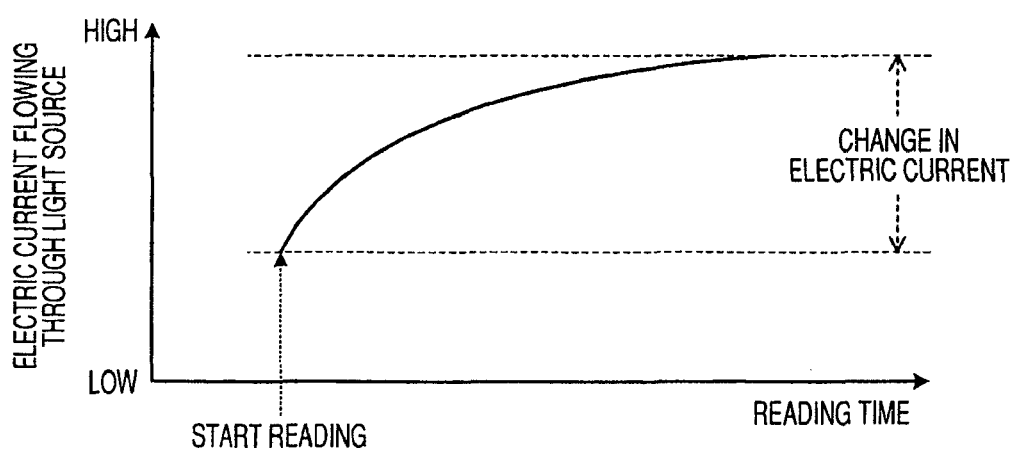
FIG. 6 is a graph showing the relationships between electric current supplied to a light source and reading time.

As shown in FIG. 6, even if it is set such that the electric-current supply circuit 121 supplies the light source 22 with a constant value of electric current (light-source electric current value), temperature of components of the electric-current supply circuit 121 changes as the reading time elapses. Thus, as shown in FIG. 6, the magnitude of electric current flowing through the light source 22 (light-source electric current value) changes. This is basically due to the temperature characteristics of transistors used in the electric-current supplying circuit 121.

Here, a degree to which the light-source electric current value changes due to a temperature change of the components of the electric-current supply circuit 121 (the magnitude of change in electric current) is not constant, but differs depending on the set light-source electric current value.

The table in FIG. 7 is obtained by measuring electric current values flowing through the light source 22 (light-source electric current values) while changing setting of the light-source electric current values. More specifically, the table is obtained by measuring the light-source electric current values while gradually decreasing the setting value of the light-source electric current value from the top row to the bottom row of the table.

"Minimum value" and "Maximum value" indicates the minimum and maximum values of the detected electric current values, respectively. For example, the minimum value is measured when the temperature of the components of the electric-current supplying circuit 121 is the lowest in the measuring period, the maximum value is measured when the temperature of the components of the electric-current supplying circuit 121 is the highest in the measuring period. However, parameters for determining the magnitude of the measured electric current value are not necessarily limited to the temperature of the components of the electric-current supplying circuit 121. For example, the magnitude of the measured electric current value sometimes changes due to temperature change of the light source 22.

"Median" is a value in the midst between the "Minimum value" and the "Maximum value". In the table of FIG. 7, each of electric current values is show by assuming that "Median" in the case where the highest electric current is supplied ("Median" in the second row of the table) is 100.

"Amount of change" is a difference between the "Maximum value" and the "Minimum value". In the table in FIG. 7, although some rows have the same "Amount of change", there is an overall tendency that "Amount of change" is greater as the light-source electric current value is smaller. In other words, there is an overall tendency that "Amount of change" is smaller as the light-source electric current value is greater.

"Ratio of change" is obtained by dividing the "Amount of change" by "Median". Thus, the "Ratio of change" indicates the degree of change in electric current by using the "Median" as the reference, for each row. As shown in FIG. 7, the "Ratio of change" tends to be greater as the light-source electric current value is smaller. In other words, "Ratio of change" tends to be smaller as the light-source electric current value is greater.

The magnitude of changes in electric current flowing through the light source 22 (hereinafter referred to as "change in the light-source electric current") can be judged based on "Amount of change" or based on "Ratio of change". In either case, the "change in the light-source electric current" tends to be smaller as the light-source electric current value is greater.

If the "change in the light-source electric current" is small, a change in luminance of the light source 22 is also small during a period when sheets of an original document are read. Thus, when reading the same color a plurality of times, the difference (variation) between a color of a pixel (a dot constituting image data) generated by reading the color first and a color of a pixel generated by reading the color afterward becomes small.

That is, as the light-source electric current value is greater, the "change in the light-source electric current" is smaller, thereby suppressing deterioration of image quality due to variations of colors of pixels when reading the same color.

(5) Original-Document Reading Process

As described above, by reducing the light-source electric current value and by increasing lighting time according to the amount of reduction of the light-source electric current value, an original document can be read in high quality (high quality in a sense that skipped regions are less).

On the other hand, by increasing the light-source electric current value and thereby suppressing changes in the light-source electric current, deterioration of image quality (deterioration of image quality in a sense that colors of pixels vary although the same color is read) can be suppressed.

Hence, in the present embodiment, the amount of change in the light-source electric current is determined during a period of reading at least one sheet of an original document. Here, when reading the at least one sheet of the original document, the light-source electric current value is increased if the change in electric current is large, compared with the case when the change in electric current is small.

An original-document reading process will be described while referring to the flowchart of FIG. 8.

In the following description, reading of an original document placed on the first reading surface 11 of the platen glass 13 is referred to as "FB scan", and reading of an original document by conveying the same with the ADF 40 is referred to as "ADF scan".

Here, an ADF scan is described as an example. This process is started when a user places at least one sheet of an original document on the paper feeding tray 41 and presses a predetermined button of the operating section 130.

In S101, the CPU 101 controls the reading device 21 to move the line sensor 26 to a position below the white reference plate 19 (the reading position of the white reference plate 19).

In S102, the CPU 101 sets the magnitude of electric current supplied to the light source 22 (light-source electric current value). This process is briefly described below.

First, the CPU 101 sets an initial value of the light-source electric current value and an initial value of the lighting time for one line, for the light source 22R. The initial value of the light-source electric current value is such a value that a pixel value is sufficiently smaller than 255 (the upper limit value of pixel values), the pixel value being generated when the reading device 21 reads the white reference plate 19 with the initial values of the light-source electric current value and the lighting time, while lighting up the light source 22R.

Next, the CPU 101 controls the reading device 21 to read the white reference plate 19 for one line with the set initial values while lighting up the light source 22R, and determines whether any one of the generated pixel values overflows. Here, an overflow is defined that a pixel value is greater than or equal to 255 (including the case that a pixel value is 255). If none of the pixel values overflows, the CPU 101 increases the light-source electric current value by one step to repeat reading of the white reference plate 19 until any of the pixel values overflows. Then, if at least one of the pixel values overflows, the CPU 101 set the light-source electric current value at that time as the light-source electric current value of the light source 22R.

Similarly, the CPU 101 set the light-source electric current values of the light source 22G and the light source 22B. The light-source electric current value set in S102 is an example of an electric current value supplied when a change in the light-source electric current value is small.

In S103, the CPU 101 sets the lighting time. This process is briefly described below. The CPU 101 controls the reading device 21 to read the white reference plate 19 for one line with the initial values of the light-source electric current value and the lighting time set in S102 while lighting up the light source 22R, and determines whether any one of the generated pixel values overflows. If at least one of the pixel values overflows, the CPU 101 reduces the lighting time by one step to repeat reading of the white reference plate 19 until none of the pixel values overflows. Then, if none of the pixel values overflows, the CPU 101 set the lighting time at that time as the lighting time of the light source 22R. Similarly, the CPU 101 set the lighting time of the light source 22G and the light source 22B.

In S104, the CPU 101 controls the light source 22 to light up with the light-source electric current value set in S102 and the lighting time set in S103 to generate white level data for shading correction. Specifically, the CPU 101 controls the reading device 21 to read the white reference plate 19 a plurality of times, for example, 32 times, and averages pixel values for each light receiving element, thereby generating white level data for each light receiving element.

In S105, the CPU 101 turns off the light source 22 to generate black level data for shading correction. Specifically, the CPU 101 controls the reading device 21 to perform reading a plurality of times, for example, 32 times, in a state of darkness where the light source 22 is turned off, and averages pixel values for each light receiving element, thereby generating black level data for each light receiving element.

In S106, the CPU 101 controls the reading device 21 to read one sheet of an original document.

In S107, the CPU 101 determines whether a subsequent sheet exists. Specifically, the CPU 101 determines that a subsequent sheet exists if the detection results of the original-document detecting sensor 107 is "ON", and determines that no subsequent sheet exists if the detection results of the original-document detecting sensor 107 is "OFF". The CPU 101 proceeds to S108 if a subsequent sheet exists (S107: Yes), and ends the reading process if no subsequent sheet exists (S107: No).

In S108, the CPU 101 determines whether a "change in the light-source electric current" is large or small. Although various modes are possible for determining whether "change in the light-source electric current" is large or small, here, determination is made based on the number of sheets of read original document, for example.

The magnitude of a change of the light-source electric current is proportional to the magnitude of a temperature change of the components of the electric-current supplying circuit 121. Further, the magnitude of a temperature change of the components of the electric-current supplying circuit 121 is proportional to the length of time during which electric current is supplied to the light source 22 (it can be referred to as the length of cumulative supply time of electric current). As the number of sheets of an original document is larger, a time period required for reading becomes longer, and hence a time period for supplying the light source 22 with electric current also becomes longer. Accordingly, the number of read sheets of the original document is large, it can be determined that a change in the light-source electric current is large. Hence, the CPU 101 counts the number of read sheets of the read original document and, if the number of read sheets reaches a predetermined number, determines that the change in the light-source electric current is large.

The above-mentioned predetermined number of sheets can be determined appropriately by experiments or the like. For example, the predetermined number of sheets may be determined by successively reading a plurality of sheets filled by the same color with the ADF 40, comparing each of the generated images to determine the number of sheets at which variation of the color begins to become large, and determining the number of sheets as the predetermined number of sheets.

Note that the predetermined number of sheets may be altered according to the reading conditions, for example. Specifically, for example, an original document is sometimes read in high image quality by conveying an original document at a low speed and reading the original document slowly (high image quality in a sense that colors of an original document are represented more accurately in detail by reading slowly). Because a longer time period is required for reading in this case, a change of electric current is larger than reading in a low image quality when the same number of sheets are read. Thus, the predetermined number of sheets may be set to a small number when reading in high image quality, and to a large number when reading in low image quality.

The CPU 101 proceeds to S109 if the CPU 101 determines that the change in electric current is large (the number of read sheets has reached the predetermined number) (S108: Yes), and returns to S106 if the CPU 101 determines that the change in electric current is small (S108: No).

In S109, the CPU 101 increases electric current supplied to the light source 22 by one step. It is desirable that the amount of increase in electric current per step is large enough to suppress deterioration of image quality due to changes of electric current. However, if the amount of increase in electric current is excessively large, lightness of the entire image changes considerably. Thus, it is desirable to set such an amount of increase that a change in lightness of an image is not easily recognizable.

Further, by increasing electric current, the lighting time of the light source 22 for one line decreases and skipped regions increase, thereby causing that image quality may deteriorate. Thus, it is desirable that electric current is not increased to a value greater than or equal to a certain value. For example, deterioration of image quality is verified by decreasing the lighting time while increasing the light-source electric current value. Based on the verification results, the lighting time by which image quality begins to deteriorate is determined as the lower limit (the minimum value) of the lighting time. Then, the light-source electric current value is increased to such an extent that the lighting time does not become lower than the lower limit.

In S110, the CPU 101 shortens the lighting time of the light source 22 for one line according to the amount of an increase in electric current in S109.

(6) Effects of the Embodiment

According to the image scanner 1 of the above-described first embodiment, if a change in electric current is large, the light-source electric current value is set to a large value for supplying the light source 22 with high electric current, thereby suppressing the change in electric current and hence suppressing deterioration of image quality (deterioration of image quality in a sense that variations of colors increases). On the other hand, if a change in electric current is small, because electric current need not be increased for suppressing a change in electric current, the light-source electric current value is set to a smaller value than the case when a change in electric current is large, thereby obtaining a high-quality image (high quality in a sense that skipped regions are small).

Further, the image scanner 1 performs controls such that the product of the magnitude of electric current supplied to the light source 22 and the lighting time for one line is constant, regardless of whether it is determined that the change of electric current is large or small. Hence, variations (differences) in lightness of an image represented by image data are less likely to be generated between the case where the change in electric current is large and the case where the change is small.

Further, according to the image scanner 1, when electric current is increased based on determination that a change in electric current is large, the electric current is increased to such an extent that the lighting time for one line does not become less than a predetermined time. Hence, deterioration in image quality due to an increase of skipped regions can be suppressed.

Further, according to the image scanner 1, if the number of read sheets of an original document reaches a predetermined number, it is determined that the change in electric current is large. As the number of sheets of an original document to be read is larger, the lighting time of the light source 22 becomes longer and hence the change in electric current increases. Thus, by appropriately setting the predetermined number of sheets and by determining that the change in electric current is large when the number of read sheets reaches the predetermined number, determination can be made appropriately whether the change in electric current is large or small.

Further, according to the image scanner 1, electric current is increased during a period from when reading of one sheet of an original document is finished until when reading of the subsequent sheet is started. Thus, luminance of the light source 22 does not change in the middle of reading of one sheet. Hence, lightness of an image represented by image data generated by reading one sheet of the original document does not change in the middle of reading, thereby suppressing deterioration of image quality.

Further, according to the image scanner 1, electric current supplied to the light source 22 is increased in a stepwise manner. Thus, electric current can be increased so that luminance of the light source 22 does not change sharply, thereby preventing a change in image quality due to an increase in the light-source electric current value from becoming highly visible.

Second Embodiment

An image reading apparatus and an image forming apparatus according to a second embodiment of the invention will be described while referring to FIG. 9.

As the number of sheets of an original document is smaller, the cumulative supply time of electric current is shorter, and hence a change in electric current flowing though the light source 22 is smaller. Generally, if the number of sheets of an original document is small, the original document is often read by FB scan. Thus, when FB scan is used, it is presumed that the number of sheets of an original document is small. That is, when FB scan is used, it is presumed that a change in the light-source electric current is small.

In contrast, as the number of sheets of an original document is larger, the cumulative supply time of electric current is longer, and hence a change in electric current flowing though the light source 22 is larger. Generally, if the number of sheets of an original document is large, the original document is often read by ADF scan. Thus, when ADF scan is used, it is presumed that the number of sheets of an original document is large. That is, when ADF scan is used, it is presumed that a change in the light-source electric current is large.

Hence, in the second embodiment, it is determined that a change in the light-source electric current is small when FB scan is used, and it is determined that a change in the light-source electric current is large when ADF scan is used.

Figure 9:
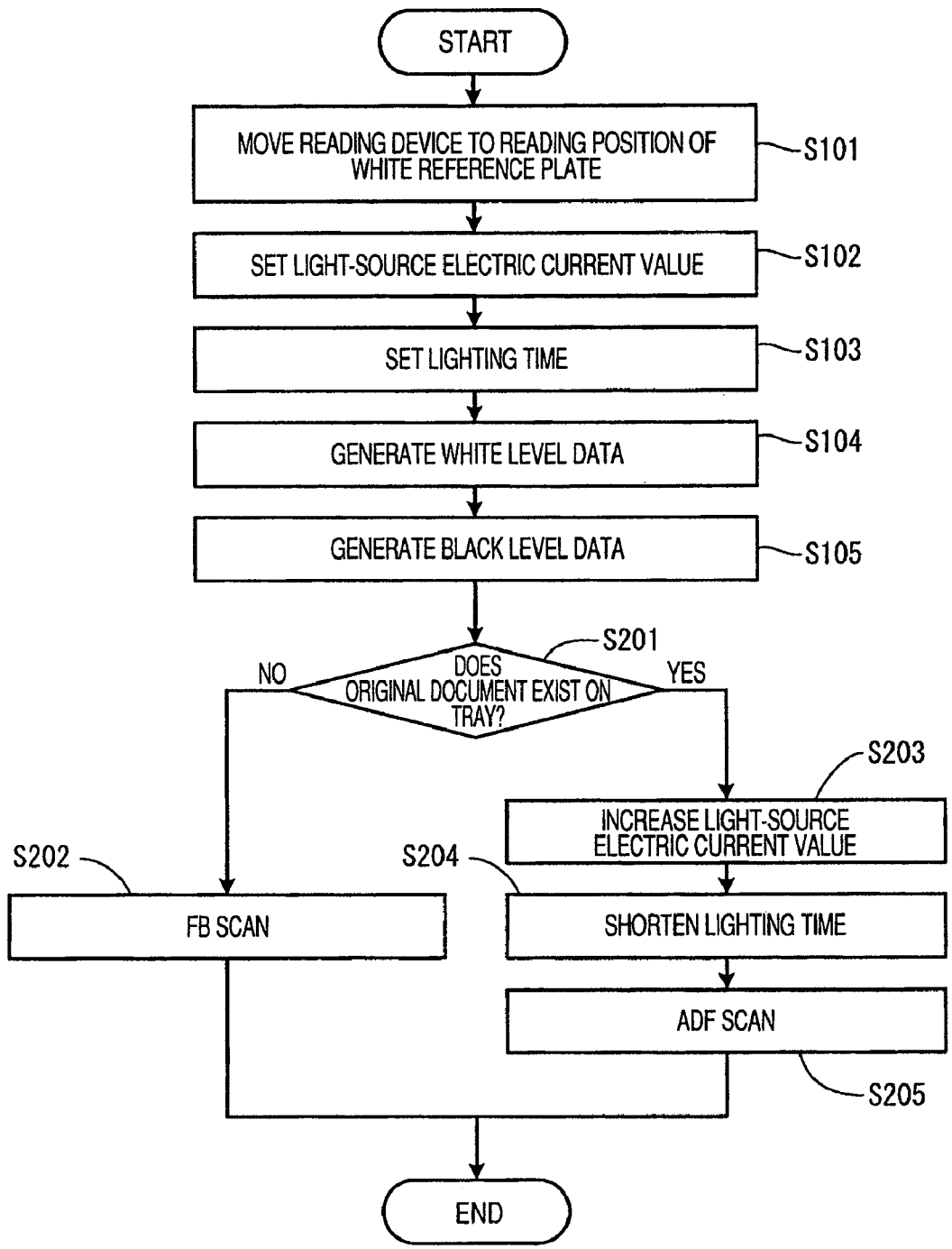
FIG. 9 is a flowchart showing an original-document reading process according to a second embodiment of the invention.

In the flowchart of FIG. 9, processes substantially identical to those in the first embodiment are designated by the same reference numerals to avoid duplicating description.

In S201, the CPU 101 uses the original-document detecting sensor 107 to detect an original document on the paper feeding tray 41, and determines that FB scan is used if no original document is detected and determines that ADF scan is used if an original document is detected. The CPU 101 proceeds to S202 if it is determined that FB scan is used (S201: No), and proceeds to S203 if it is determined that ADF scan is used (S201: Yes).

In S202, the CPU 101 controls the reading device 21 to read the original document placed on the first reading surface 11 (FB scan). That is, during FB scan, the CPU 101 reads the original document by supplying the light source 22 with electric current having magnitude to be supplied when a change in electric current is small.

In S203, the CPU 101 sets a light-source electric current value that is larger than the light-source electric current value set in S102 by a predetermined amount. This predetermined amount can be determined appropriately based on experiments or the like. For example, an experiment can be performed such that a plurality of sheets of an original document is read by the ADF 40, for verifying and determining such an amount (predetermined amount) that variations in colors (variations in pixel values) are not highly visible when the same color is read.

In S204, the CPU 101 shortens the lighting time for one line according to the amount of an increase in electric current in S203.

In S205, the CPU 101 controls the ADF 40 to convey the sheets of the original document so as to pass the second reading surface 12, while controlling the reading device 21 to read the sheets of the original document (ADF scan).

According to the image scanner of the above-described second embodiment, it is determined that a change in the light-source electric current is small when FB scan is used, and it is determined that a change in the light-source electric current is large when ADF scan is used, thereby determining appropriately whether the change is large or small.

Third Embodiment

An image reading apparatus and an image forming apparatus according to a third embodiment of the invention will be described while referring to FIG. 10.

In the third embodiment, when an original document is read in high image quality higher than a predetermined image quality, electric current is increased in the middle of reading of one sheet of the original document.

Here, high image quality means high quality in a sense that skipped regions are small. This means, for example, that a dpi value in the sub-scanning direction set by a user is large. In order to decrease skipped regions, the lighting time needs to be increased. Thus, the cumulative supply time of electric current becomes longer, compared with low image quality where skipped regions are large, even through a time period for reading an original document is the same. Therefore, there is a possibility that electric current changes considerably during reading of one sheet of an original document. Hence, in the third embodiment, when an original document is read in high image quality, electric current is increased in the middle of reading of one sheet of the original document.

Figure 10:
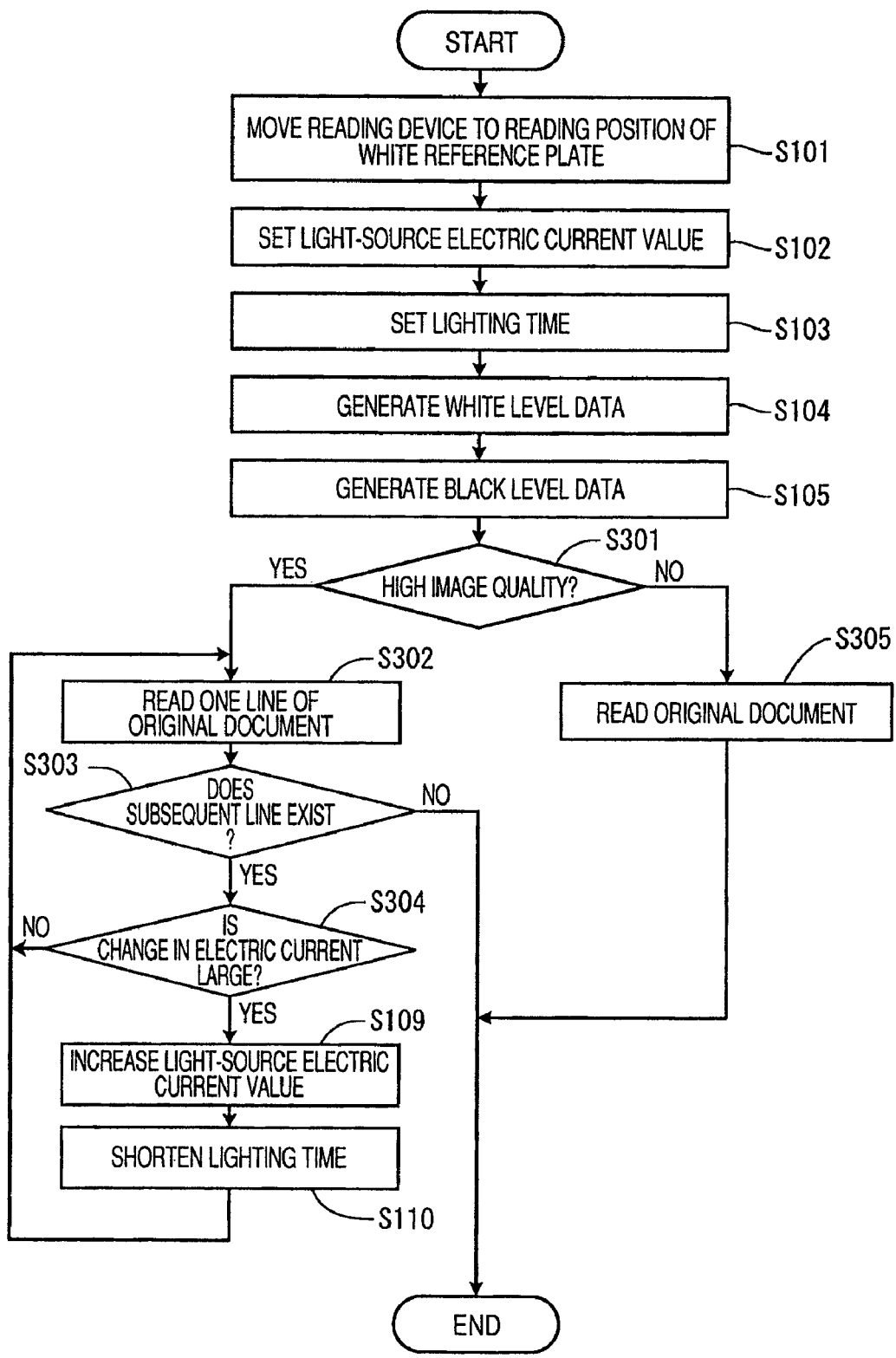
FIG. 10 is a flowchart showing an original-document reading process according to a third embodiment of the invention.

In the flowchart of FIG. 10, processes substantially identical to those in the first embodiment are designated by the same reference numerals to avoid duplicating description. Here, FB scan is described as an example.

In S301, the CPU 101 determines whether a user has set reading in high image quality or in low image quality. If the image quality set by the user is higher than or equal to a predetermined image quality (for example, a predetermined value of dpi), the CPU 101 determines that high image quality is set (S301: Yes), and proceeds to S302. If the image quality set by the user is lower than the predetermined image quality, the CPU 101 determines that low image quality is set (S301: No), and proceeds to S305.

In S302, the CPU 101 controls the reading device 21 to read one line of an original document placed on the first reading surface 11.

In S303, the CPU 101 determines whether a subsequent line exists. If a subsequent line exists (S303: Yes), the CPU 101 proceeds to S304. If no subsequent line exists (S303: No), the CPU 101 ends the process since all the lines of the original document have been read.

In S304, the CPU 101 determines whether a change in the light-source electric current is large or small. Here, it is determined that a change in electric current is large if the amount of read image data is larger than or equal to a predetermined amount, and it is determined that a change in electric current is small if the amount of read image data is less than the predetermined amount. This predetermined amount can be determined appropriately based on experiments or the like. If the CPU 101 determines that a change in the light-source electric current is large (S304: Yes), the CPU 101 proceeds to S109. If the CPU 101 determines that the change is small (S304: No), the CPU 101 returns to S302 to read a subsequent line.

In S305, the CPU 101 controls the reading device 21 to read an original document placed on the first reading surface 11. That is, in S305, the CPU 101 reads the original document by supplying the light source 22 with electric current having magnitude to be supplied when a change in electric current is small.

According to the image scanner of the above-described third embodiment, it is determined that a change in electric current is large when the amount of image data reaches a predetermined amount. As the amount of image data is larger, the lighting time of the light source 22 is longer and thus a change in electric current becomes larger. Thus, the predetermined amount is set appropriately based on experiments or the like, and it is determined that a change in electric current is large when the amount of image data reaches a predetermined amount, thereby determining appropriately whether the change in electric current is large or small.

Additionally, according to the image scanner of the third embodiment, when an original document is read in high image quality, electric current is increased in the middle of reading of one sheet of the original document. In a single image obtained by reading one sheet of an original document, deterioration of image quality can be suppressed by reducing variations between colors of pixels generated by reading a former part of the sheet and colors of pixels generated by reading a later part of the sheet.

In the above-described embodiment, descriptions were given with a definition of high image quality that skipped regions are small. However, the definition of high image quality is not limited to this. For example, a high quality image may be defined as an image that is obtained by setting a long period of one line and reading an original document slowly (that is, reading slowly in the main scanning direction), thereby reproducing colors of the original document accurately. Conversely, a low quality image may be defined as an image that is obtained by setting a short period of one line and reading an original document quickly, thereby prioritizing reduction of reading time rather than reproducibility of colors. In this case, because the cumulative supply time of electric current becomes longer in high image quality, there is a possibility that a change in the light-source electric current becomes larger. Hence, variations of colors can be reduced by increasing the light-source electric current in high image quality.

Fourth Embodiment

An image reading apparatus and an image forming apparatus according to a fourth embodiment of the invention will be described while referring to FIG. 11.

In the fourth embodiment, a temperature sensor is provided for measuring temperature of components of the electric-current supplying circuit 121. When it is determined that a change in electric current is large and electric current is increased in a stepwise manner, timing of increasing electric current is determined based on temperature measured by the temperature sensor. The configuration of an image scanner according to the fourth embodiment is substantially identical to the image scanner 1 of the first embodiment, except that the temperature sensor is provided.

Figure 11:
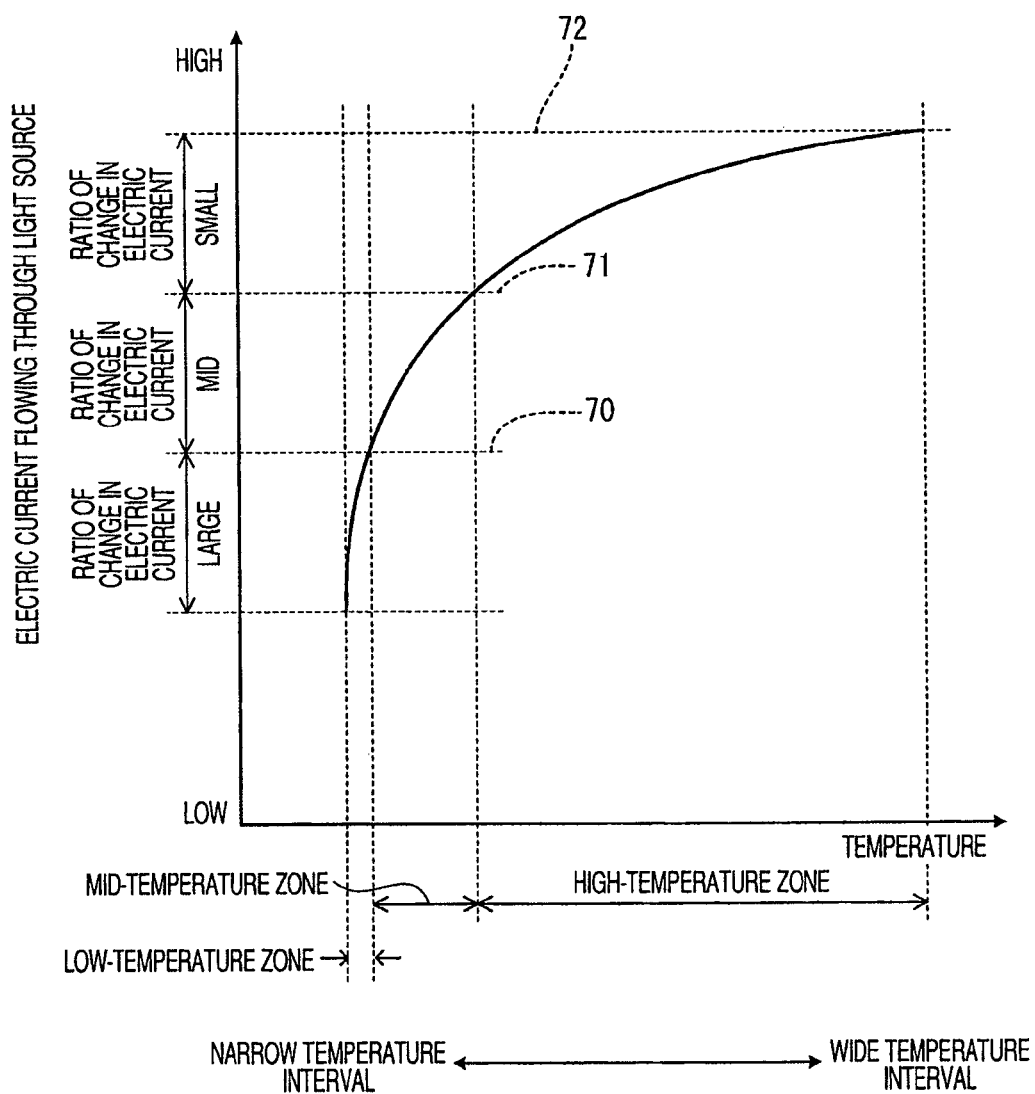
FIG. 11 is a graph showing the relationships between changes in electric current and temperature of components of an electric-current supplying circuit, according to a fourth embodiment of the invention.

As shown in FIG. 11, a change in light-source electric current is larger as temperature is lower, and the change is smaller as temperature is higher. Hence, if electric current is increased at a constant time interval and the amount of increase in electric current is the same at each timing, for example, then image quality tends to be nonuniform because the amount of increase is constant although a degree of change in electric current varies at each timing.

Thus, when the amount of increase in electric current is set to a constant value at each timing, the CPU 101 determines timing of increasing electric current based on temperature of the components of the electric-current supplying circuit 121 that is measured by the temperature sensor. Specifically, when temperature of the components of the electric-current supplying circuit 121 is low, the CPU 101 increases electric current by a constant amount at timing when the amount of change in temperature is small. Conversely, when temperature of the components of the electric-current supplying circuit 121 is high, the CPU 101 increases electric current by the same constant amount at timing when the amount of change in temperature is large.

For example, the amount of change in temperature can be determined by obtaining temperatures at intersection points of a temperature-current curve in the graph of FIG. 11 and each horizontal lines separating the vertical axis (electric current) at equal distances (for example, dotted lines 70, 71, and 72). At how much distances (how finely) the vertical axis should be separated can be determined appropriately.

According to the image scanner of the above-described fourth embodiment, when electric current is increased in a stepwise manner, timing of increasing electric current is determined based on temperature measured by the temperature sensor, thereby making image quality more uniform.

Modifications

While the invention has been described in detail with reference to the above aspects thereof, it would be apparent to those skilled in the art that various changes and modifications may be made therein without departing from the scope of the claims.

(1) In the above-described first embodiment, when the number of read sheets of an original document reaches a predetermined number, it is determined that a change in the light-source electric current is large. However, various other methods can be used to determine whether a change in the light-source electric current is large or small.

Figure 8:
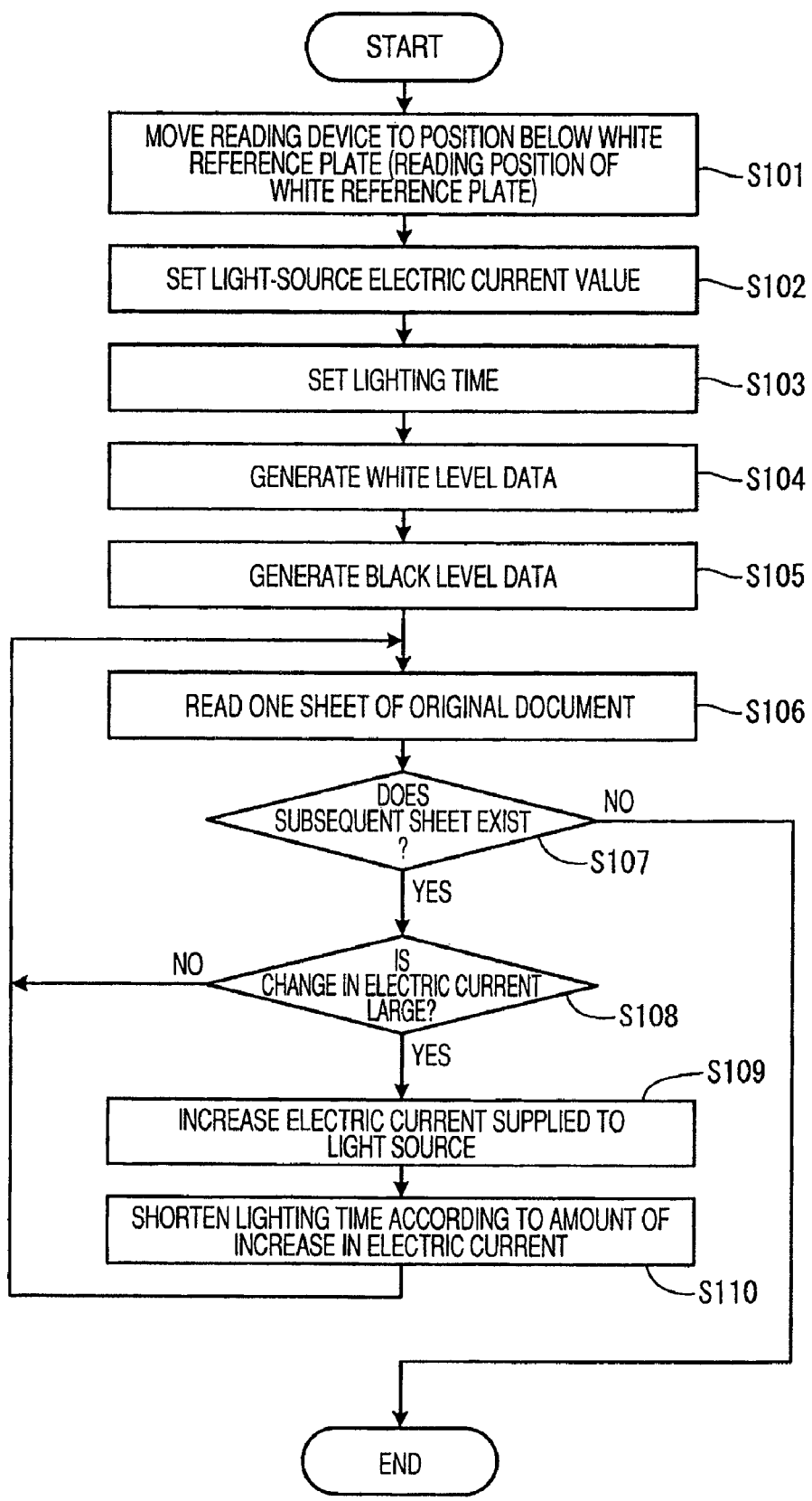
FIG. 8 is a flowchart showing an original-document reading process according to the first embodiment.

For example, it may be so configured that an ammeter is provided for measuring electric current flowing through the light source 22, that an electric current value is measured at the start of reading an original document, that an electric current value is again measured at the timing of S108 in FIG. 8, and that it is determined that a change in the light-source electric current is large if the difference between the both electric current values is larger than or equal to a certain value.

Further, as described above, a change in temperature of the components of the electric-current supplying circuit 121 is proportional to the length of time during which the light source 22 is supplied with electric current. Thus, time elapsed since the start of reading may be measured with a timer, and it may be determined that a change in the light-source electric current is large if the elapsed time reaches a predetermined time. In other words, it may be determined that the change in the light-source electric current is large if a time period during which at least one sheet of an original document is read reaches a predetermined period.

Here, the above-mentioned predetermined time may be changed according to the reading conditions, for example. Specifically, for example, the lighting time for one line is longer when an original document is read in high image quality, than when the original document is read in low image quality. Thus, when an original document is read in high image quality, the cumulative supply time of electric current during that time is longer, although the same time elapses. Hence, even when the same time elapses, the amount of a change in electric current may differ. Accordingly, the above-mentioned predetermined time may be set to a shorter time when reading in high image quality, and to a longer time when reading in low image quality.

Further, temperature of the components of the electric-current supplying circuit 121 and the light-source electric current have correlation depending on the resistance-temperature characteristics of the components of the electric-current supplying circuit 121. Determination may be made based on temperature of the components of the electric-current supplying circuit 121. Specifically, for example, it may be so configured that a temperature sensor is provided for measuring temperature of the components of the electric-current supplying circuit 121, that temperature is measured at the start of reading, that temperature is again measured in S108, and that it is determined that a change in electric current is large if the difference between the both temperatures reaches a certain value. Alternatively, it may be determined that a change in electric current is large if temperature measured by the temperature sensor reaches a predetermined temperature.

(2) In the above-described first embodiment, the amount of increase in electric current is the same at each step. However, the amount of increase in electric current at one step may be decreased gradually. Because a change in temperature of the components of the electric-current supplying circuit 121 decreases as time elapses, a change in electric current also decreases as time elapses. Hence, changes in image quality can be made less visible by gradually decreasing the amount of increase in electric current.

(3) In the above-described fourth embodiment, the amount of increase in electric current is the same at each timing. However, timing may be fixed, for example, at a constant time interval or the like, and the amount of increase in electric current may be determined based on a degree of a change in temperature from the previous timing to the present timing.

(4) In the above-described embodiments, the image scanner is described as an example of an image reading apparatus. However, the invention may be applied to a so-called multi-function device having a printer function, a scanner function, a copier function, a facsimile function, and the like.

What is claimed is:

1. An image reading apparatus comprising:
a light source that is configured to light up at luminance associated with supplied electric current;
an electric-current supplying section that is configured to supply the light source with electric current;
a control section that is configured to control the electric-current supplying section;
a reading section that is configured to read at least one sheet of an original document on which light from the light source is irradiated and to generate image data; and
a determining section that is configured to determine whether a change in the electric current flowing through the light source is large, based on a predetermined criterion, during a period when the reading section reads the at least one sheet of the original document,
wherein, when the reading section reads the at least one sheet of the original document, the control section is configured to increase electric current supplied to the light source if the determining section determines that the change is large relative to electric current supplied to the light source when the determining section determines that the change is small,
wherein the reading section comprises a line sensor that is configured to read the original document one line at a time by moving relative to the original document, and
wherein the control section is configured to control the electric-current supplying section such that a product is constant regardless of whether the determining section determines that the change is large or small, the product being a magnitude of the electric current supplied to the light source multiplied by a time period of lighting of the light source per line.

2. The image reading apparatus according to claim 1, wherein the control section is configured to increase the electric current to an extent that the time period of lighting of the light source per line does not become less than a predetermined period, when the determining section determines that the change is large.

3. An image reading apparatus comprising:
a light source that is configured to light up at luminance associated with supplied electric current;
an electric-current supplying section that is configured to supply the light source with electric current;
a control section that is configured to control the electric-current supplying section;
a reading section that is configured to read at least one sheet of an original document on which light from the light source is irradiated and to generate image data, the reading section comprising:
a line sensor;
a tray on which at least one sheet of an original document is stacked; and
an original-document conveying section that is configured to convey the at least one sheet of the original document stacked on the tray one sheet at a time to pass a reading position of the line sensor; and
a determining section that is configured to determine whether a change in the electric current flowing through the light source is large, based on a predetermined criterion, during a period when the reading section reads the at least one sheet of the original document,
wherein, when the reading section reads the at least one sheet of the original document, the control section is configured to increase electric current supplied to the light source if the determining section determines that the change is large relative to electric current supplied to the light source when the determining section determines that the change is small,
wherein the determining section is configured to determine that the change is large if a number of the at least one sheet of the original document read by the reading section reaches a predetermined number, and
wherein the control section is configured to control the electric-current supplying section to supply electric current to be supplied when the change is small until the determining section determines that the change is large, and to increase electric current when the determining section determines that the change is large.

4. The image reading apparatus according to claim 3, wherein the control section is configured to increase electric current during a period from when the reading section finishes reading of one sheet of the original document until when the reading section starts reading of a subsequent sheet of the original document.

5. An image reading apparatus comprising:
a light source that is configured to light up at luminance associated with supplied electric current;
an electric-current supplying section that is configured to supply the light source with electric current;
a control section that is configured to control the electric-current supplying section;
a reading section that is configured to read at least one sheet of an original document on which light from the light source is irradiated and to generate image data; and
a determining section that is configured to determine whether a change in the electric current flowing through the light source is large, based on a predetermined criterion, during a period when the reading section reads the at least one sheet of the original document,
wherein, when the reading section reads the at least one sheet of the original document, the control section is configured to increase electric current supplied to the light source if the determining section determines that the change is large relative to electric current supplied to the light source when the determining section determines that the change is small,
wherein the reading section is capable of reading an original document at a plurality of levels of image quality, and
wherein the control section is configured to increase electric current in the middle of reading of one sheet of the original document when the reading section reads the original document at image quality higher than or equal to a predetermined level, and to maintain electric current during reading of one sheet of the original document when the reading section reads the original document at image quality lower than the predetermined level.

6. An image reading apparatus comprising:
a light source that is configured to light up at luminance associated with supplied electric current;
an electric-current supplying section that is configured to supply the light source with electric current;
a control section that is configured to control the electric-current supplying section;
a reading section that is configured to read at least one sheet of an original document on which light from the light source is irradiated and to generate image data; and
a determining section that is configured to determine whether a change in the electric current flowing through the light source is large, based on a predetermined criterion, during a period when the reading section reads the at least one sheet of the original document,
wherein, when the reading section reads the at least one sheet of the original document, the control section is configured to increase electric current supplied to the light source if the determining section determines that the change is large relative to electric current supplied to the light source when the determining section determines that the change is small,
wherein the determining section is configured to determine that the change is large if an amount of the image data generated by the reading section reaches a predetermined amount, and
wherein the control section is configured to control the electric-current supplying section to supply electric current to be supplied when the change is small until the determining section determines that the change is large, and to increase electric current when the determining section determines that the change is large.

7. An image reading apparatus comprising:
a light source that is configured to light up at luminance associated with supplied electric current;
an electric-current supplying section that is configured to supply the light source with electric current;
a control section that is configured to control the electric-current supplying section;
a reading section that is configured to read at least one sheet of an original document on which light from the light source is irradiated and to generate image data; and
a determining section that is configured to determine whether a change in the electric current flowing through the light source is large, based on a predetermined criterion, during a period when the reading section reads the at least one sheet of the original document,
wherein, when the reading section reads the at least one sheet of the original document, the control section is configured to increase electric current supplied to the light source if the determining section determines that the change is large relative to electric current supplied to the light source when the determining section determines that the change is small,
wherein the determining section is configured to determine that the change is large if a time period during which the reading section reads the at least one sheet of the original document reaches a predetermined period, and
wherein the control section is configured to control the electric-current supplying section to supply electric current to be supplied when the change is small until the determining section determines that the change is large, and to increase electric current when the determining section determines that the change is large.

8. The image reading apparatus according to claim 1, further comprising a temperature sensor that is configured to measure a temperature of the electric-current supplying section,
wherein the determining section is configured to determine whether the change is large based on the temperature measured by the temperature sensor; and
wherein the control section is configured to control the electric-current supplying section to supply electric current to be supplied when the change is small until the determining section determines that the change is large, and to increase electric current when the determining section determines that the change is large.

9. The image reading apparatus according to claim 8, wherein the determining section is configured to determine whether the change is large if the temperature measured by the temperature sensor reaches a predetermined temperature.

10. An image reading apparatus comprising:
an electric-current supplying section that is configured to supply the light source with electric current;
a control section that is configured to control the electric-current supplying section;
a reading section that is configured to read at least one sheet of an original document on which light from the light source is irradiated and to generate image data, the reading section comprising:
a line sensor;
an original-document placing bed on which a sheet of an original document is placed;
a sensor moving section that is configured to move the line sensor along the original-document placing bed;
a tray on which at least one sheet of an original document is stacked; and an original-document conveying section that is configured to convey the at least one sheet of the original document stacked on the tray one sheet at a time to pass a reading position of the line sensor; and a determining section that is configured to determine whether a change in the electric current flowing through the light source is large, based on a predetermined criterion, during a period when the reading section reads the at least one sheet of the original document, wherein, when the reading section reads the at least one sheet of the original document, the control section is configured to increase electric current supplied to the light source if the determining section determines that the change is large relative to electric current supplied to the light source when the determining section determines that the change is small, wherein the determining section is configured to determine that the change is small if the reading section reads the sheet of the original document placed on the original-document placing bed, and to determine that the change is large if the reading section reads the at least one sheet of the original document that is originally stacked on the tray and is conveyed to the reading position by the original-document conveying section.

11. The image reading apparatus according to claim 1, wherein the control section is configured to increase the electric current in a stepwise manner when the determining section determines that the change is large.

12. The image reading apparatus according to claim 11, wherein the control section is configured to increase the electric current in a stepwise manner, such that an amount of increase in the electric current per step decreases gradually.

13. The image reading apparatus according to claim 11, further comprising a temperature sensor that is configured to measure a temperature of the electric-current supplying section,
wherein the control section is configured to determine timing of increasing electric current based on the temperature measured by the temperature sensor.

14. An image forming apparatus comprising:
an image reading unit comprising:
a light source that is configured to light up at luminance associated with supplied electric current;
an electric-current supplying section that is configured to supply the light source with electric current;
a control section that is configured to control the electric-current supplying section;
a reading section that is configured to read at least one sheet of an original document on which light from the light source is irradiated and to generate image data; and
a determining section that is configured to determine whether a change in the electric current flowing through the light source is large, based on a predetermined criterion, during a period when the reading section reads the at least one sheet of the original document,
wherein, when the reading section reads the at least one sheet of the original document, the control section is configured to increase electric current supplied to the light source if the determining section determines that the change is large relative to electric current supplied to the light source when the determining section determines that the change is small; and
an image forming unit that is configured to form an image on a recording medium based on the image data generated by the image reading unit;

wherein the reading section comprises a line sensor that is configured to read the original document one line at a time by moving relative to the original document, and
wherein the control section is configured to control the electric-current supplying section such that a product is constant regardless of whether the determining section determines that the change is large or small, the product being a magnitude of the electric current supplied to the light source multiplied by a time period of lighting of the light source per line.

15. An image forming apparatus comprising:
an image reading unit comprising:
a light source that is configured to light up at luminance associated with supplied electric current;
an electric-current supplying section that is configured to supply the light source with electric current;
a control section that is configured to control the electric-current supplying section;
a reading section that is configured to read at least one sheet of an original document on which light from the light source is irradiated and to generate image data, the reading section comprising:
a line sensor;
a tray on which at least one sheet of an original document is stacked; and
an original-document conveying section that is configured to convey the at least one sheet of the original document stacked on the tray one sheet at a time to pass a reading position of the line sensor; and
a determining section that is configured to determine whether a change in the electric current flowing through the light source is large, based on a predetermined criterion, during a period when the reading section reads the at least one sheet of the original document,
wherein, when the reading section reads the at least one sheet of the original document, the control section is configured to increase electric current supplied to the light source if the determining section determines that the change is large relative to electric current supplied to the light source when the determining section determines that the change is small; and
an image forming unit that is configured to form an image on a recording medium based on the image data generated by the image reading unit,
wherein the determining section is configured to determine that the change is large if a number of the at least one sheet of the original document read by the reading section reaches a predetermined number, and
wherein the control section is configured to control the electric-current supplying section to supply electric current to be supplied when the change is small until the determining section determines that the change is large, and to increase electric current when the determining section determines that the change is large.

16. An image forming apparatus comprising:
an image reading unit comprising:
a light source that is configured to light up at luminance associated with supplied electric current;
an electric-current supplying section that is configured to supply the light source with electric current;
a control section that is configured to control the electric-current supplying section;
a reading section that is configured to read at least one sheet of an original document on which light from the light source is irradiated and to generate image data; and a determining section that is configured to determine whether a change in the electric current flowing through the light source is large, based on a predetermined criterion, during a period when the reading section reads the at least one sheet of the original document, wherein, when the reading section reads the at least one sheet of the original document, the control section is configured to increase electric current supplied to the light source if the determining section determines that the change is large relative to electric current supplied to the light source when the determining section determines that the change is small; and an image forming unit that is configured to form an image on a recording medium based on the image data generated by the image reading unit, wherein the reading section is capable of reading an original document at a plurality of levels of image quality, and wherein the control section is configured to increase electric current in the middle of reading of one sheet of the original document when the reading section reads the original document at image quality higher than or equal to a predetermined level, and to maintain electric current during reading of one sheet of the original document when the reading section reads the original document at image quality lower than the predetermined level.

17. An image forming apparatus comprising:

an image reading unit comprising:

a light source that is configured to light up at luminance associated with supplied electric current;

an electric-current supplying section that is configured to supply the light source with electric current;

a control section that is configured to control the electric-current supplying section;

a reading section that is configured to read at least one sheet of an original document on which light from the light source is irradiated and to generate image data; and a determining section that is configured to determine whether a change in the electric current flowing through the light source is large, based on a predetermined criterion, during a period when the reading section reads the at least one sheet of the original document, wherein, when the reading section reads the at least one sheet of the original document, the control section is configured to increase electric current supplied to the light source if the determining section determines that the change is large relative to electric current supplied to the light source when the determining section determines that the change is small; and an image forming unit that is configured to form an image on a recording medium based on the image data generated by the image reading unit, wherein the determining section is configured to determine that the change is large if an amount of the image data generated by the reading section reaches a predetermined amount; and wherein the control section is configured to control the electric-current supplying section to supply electric current to be supplied when the change is small until the determining section determines that the change is large, and to increase electric current when the determining section determines that the change is large.

18. An image forming apparatus comprising:

an image reading unit comprising:

a light source that is configured to light up at luminance associated with supplied electric current;

an electric-current supplying section that is configured to supply the light source with electric current;

a control section that is configured to control the electric-current supplying section;

a reading section that is configured to read at least one sheet of an original document on which light from the light source is irradiated and to generate image data; and a determining section that is configured to determine whether a change in the electric current flowing through the light source is large, based on a predetermined criterion, during a period when the reading section reads the at least one sheet of the original document, wherein, when the reading section reads the at least one sheet of the original document, the control section is configured to increase electric current supplied to the light source if the determining section determines that the change is large relative to electric current supplied to the light source when the determining section determines that the change is small; and an image forming unit that is configured to form an image on a recording medium based on the image data generated by the image reading unit, wherein the determining section is configured to determine that the change is large if a time period during which the reading section reads the at least one sheet of the original document reaches a predetermined period; and wherein the control section is configured to control the electric-current supplying section to supply electric current to be supplied when the change is small until the determining section determines that the change is large, and to increase electric current when the determining section determines that the change is large.

19. An image forming apparatus comprising:

an image reading unit comprising:

a light source that is configured to light up at luminance associated with supplied electric current;

an electric-current supplying section that is configured to supply the light source with electric current;

a control section that is configured to control the electric-current supplying section;

a reading section that is configured to read at least one sheet of an original document on which light from the light source is irradiated and to generate image data, the reading section comprising:

a line sensor;

an original-document placing bed on which a sheet of an original document is placed;

a sensor moving section that is configured to move the line sensor along the original-document placing bed;

a tray on which at least one sheet of an original document is stacked; and an original-document conveying section that is configured to convey the at least one sheet of the original document stacked on the tray one sheet at a time to pass a reading position of the line sensor; and a determining section that is configured to determine whether a change in the electric current flowing through the light source is large, based on a predetermined criterion, during a period when the reading section reads the at least one sheet of the original document, wherein, when the reading section reads the at least one sheet of the original document, the control section is configured to increase electric current supplied to the light source if the determining section determines that the change is large relative to electric current supplied to the light source when the determining section determines that the change is small; and an image forming unit that is configured to form an image on a recording medium based on the image data generated by the image reading unit, wherein the determining section is configured to determine that the change is small if the reading section reads the sheet of the original document placed on the original-document placing bed, and to determine that the change is large if the reading section reads the at least one sheet of the original document that is originally stacked on the tray and is conveyed to the reading position by the original-document conveying section.

* * * * *